US012640002B2

(12) United States Patent
Baum et al.

(10) Patent No.: US 12,640,002 B2
(45) Date of Patent: May 26, 2026

(54) ELECTRONIC GAMING MACHINE WITH MULTI-STACKED TRANSPARENT DISPLAY PANELS

(71) Applicant: Aristocrat Technologies, Inc., Las Vegas, NV (US)

(72) Inventors: Michael Baum, Las Vegas, NV (US); Rajendrasinh Jadeja, Las Vegas, NV (US)

(73) Assignee: Aristocrat Technologies, Inc., Las Vegas, NV (US)

(*) Notice: Subject to any disclaimer, the term of this patent is extended or adjusted under 35 U.S.C. 154(b) by 291 days.

(21) Appl. No.: 18/473,804

(22) Filed: Sep. 25, 2023

(65) Prior Publication Data

US 2024/0203193 A1 Jun. 20, 2024

Related U.S. Application Data

(60) Provisional application No. 63/476,357, filed on Dec. 20, 2022.

(51) Int. Cl.

| | |
|---|---|
| ***G09G 3/00*** | (2006.01) |
| ***A63F 13/2145*** | (2014.01) |
| ***A63F 13/26*** | (2014.01) |
| ***G06F 3/03*** | (2006.01) |
| ***G06F 3/041*** | (2006.01) |
| ***G07F 17/32*** | (2006.01) |

(52) U.S. Cl.
CPC ...... *G07F 17/3211* (2013.01); *G07F 17/3216* (2013.01)

(58) Field of Classification Search
CPC ...... G09G 3/2092; G09G 3/32; G09G 3/3208; G09G 2300/023; G09G 2300/0456; A63F 13/2145; A63F 2009/2457; G02B 30/52; G02F 2201/44; G02F 1/1347; G02F 1/1647; G07F 17/3211; G07F 17/3216; H04N 13/395; H10K 59/50
See application file for complete search history.

(56) References Cited

U.S. PATENT DOCUMENTS

| | | | |
|---|---|---|---|
| 8,976,323 B2 | 3/2015 | Smithwick | |
| 10,520,782 B2 | 12/2019 | Busch | |
| 10,539,806 B2 | 1/2020 | Kim-Whitty | |
| 10,565,925 B2 | 2/2020 | Perdices-Gonzalez | |
| 10,922,040 B2 | 2/2021 | Bolton | |
| 2018/0158385 A1* | 6/2018 | Reichow ............. | A63F 13/2145 |

* cited by examiner

*Primary Examiner* — Lawrence S Galka
(74) *Attorney, Agent, or Firm* — Armstrong Teasdale LLP

(57) ABSTRACT

An electronic gaming device including a display device and a game controller is provided. The display device includes a cover panel and a plurality of display panels stacked behind the cover panel, wherein the plurality of display panels includes at least a first display panel and a second display panel. The game controller is configured to cause display of a first image on the first display panel, cause display of a second image on the second display panel, and to transmit a signal to the first display panel. The signal may cause a portion of the first display panel to appear transparent such at least a portion of the second image displayed on the second display panel is at least partially visible through the first display panel so at least a portion of the first image and at least the portion of second image appear as a combined, three-dimensional image.

20 Claims, 10 Drawing Sheets

ELECTRONIC GAMING MACHINE WITH MULTI-STACKED TRANSPARENT DISPLAY PANELS

CROSS-REFERENCE TO RELATED APPLICATIONS

This application claims the benefit of priority to U.S. Provisional Patent Application No. 63/476,357, filed Dec. 20, 2022, the content of which is incorporated herein by reference in its entirety.

TECHNICAL FIELD

The field of disclosure relates generally to electronic gaming, and more specifically, to an electronic gaming machine that includes multi-stacked display panels.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player via a printed "ticket" upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming device is provided. The electronic gaming device includes a display device and a game controller that includes at least one processor in communication with a memory. The display device includes a cover panel and a plurality of display panels stacked behind the cover panel, wherein the plurality of display panels includes at least a first display panel and a second display panel. The game controller is configured to cause display of a first image on the first display panel and cause display of a second image on the second display panel. The game controller is also configured to transmit a signal to the first display panel. The signal may cause at least a portion of the first display panel to appear transparent such at least a portion of the second image displayed on the second display panel is at least partially visible through the first display panel so at least a portion of the first image and at least the portion of second image form a combined view. The combined view may comprise a three-dimensional image when viewed by a user looking through both the first and second display panels towards the electronic gaming device.

In another aspect, an electronic gaming device is provided. The electronic gaming device includes a display device comprising a cover panel and a plurality of display panels stacked behind the cover panel, wherein the plurality of display panels includes at least a first display panel and a second display panel; and a game controller comprising at least one processor in communication with a memory, wherein the game controller is configured to provide display data to at least one of the first and second display panels to cause a display of a single image when viewed by a user looking through both the first and second display panels towards the electronic gaming device, wherein causing the display of the single image includes causing at least one of a portion of the first display panel and a portion of the second display panel to appear transparent.

In another aspect, a method of displaying data at an electronic gaming device is provided. The method includes displaying a first image at a first display panel, displaying a second image at a second display panel, and transmitting a signal to the first display panel, wherein the signal causes at least a portion of the first display panel to appear transparent such at least a portion of the second image displayed on the second display panel is at least partially visible through the first display panel so at least a portion of the first image and at least the portion of second image appear as a combined, three-dimensional image when viewed by a user looking through both the first and second display panels towards the electronic gaming device.

BRIEF DESCRIPTION OF THE DRAWINGS

An example embodiment of the subject matter disclosed will now be described with reference to the accompanying drawings.

DETAILED DESCRIPTION

Figure 1:
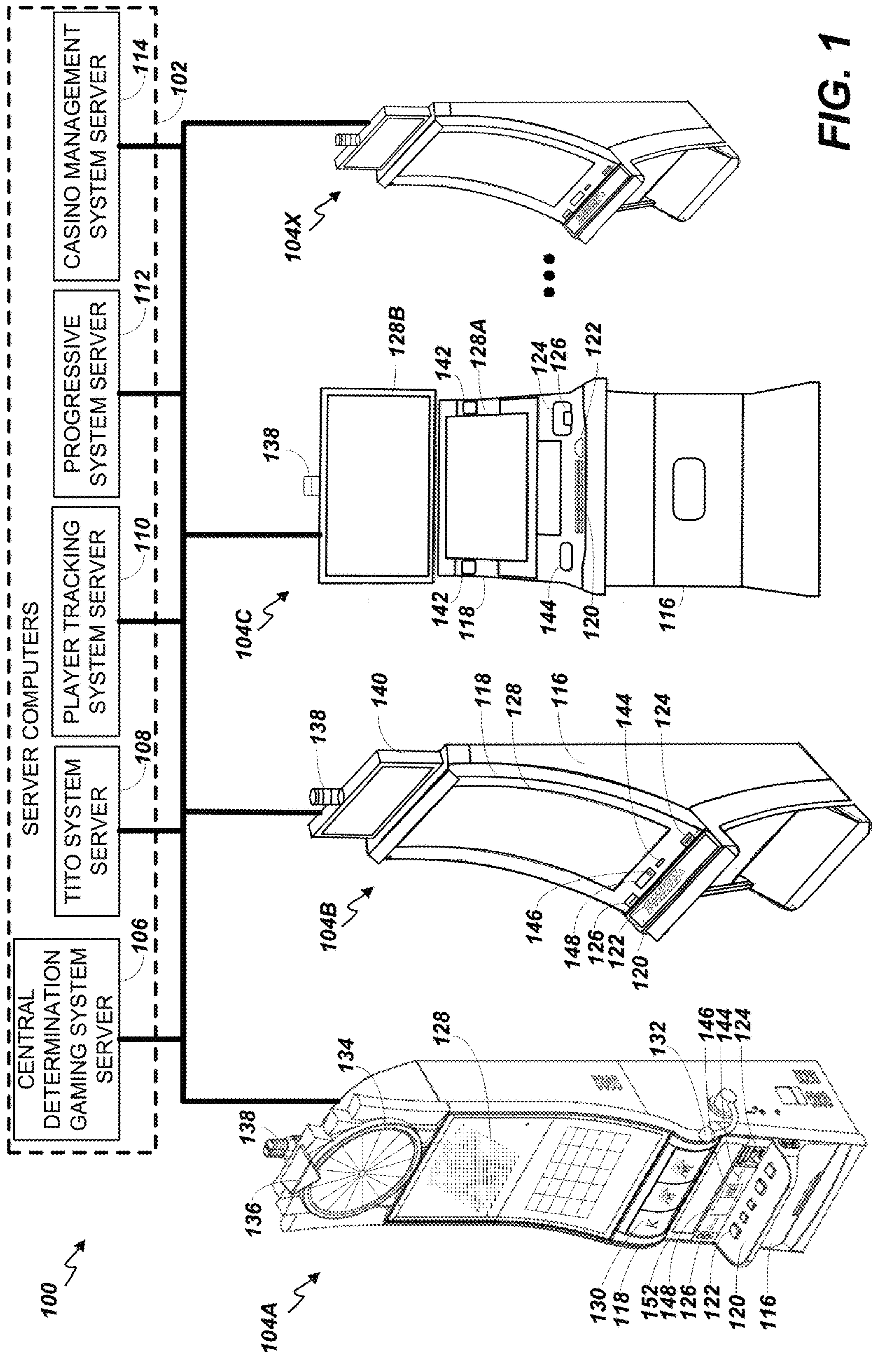
FIG. 1 is an exemplary diagram showing several EGMs networked with various gaming related servers.

The present application is directed to electronic gaming, and more specifically, to an electronic gaming machine including multi-stacked transparent display panels. The display panels may include a first display panel positioned in front of (e.g., closer to a user or player of the electronic gaming machine) a second display panel. The first display panel may at least partially overlay the second display panel, with the first display panel and the second display panel being adjacent to one another. The first display panel may include an OLED (organic light-emitting diode) display that generates images without the use of a backlight. The second display panel may include an OLED display or may alternatively include an LCD display (liquid-crystal display) that generates images using a backlight. The first and second display panels may include any other display panel that includes a display that functions in a manner described herein, including, but not limited to, LED array monitors, static images, and/or static objects.

The multi-stacked transparent display panels may be used to display a three-dimensional image to a user or player of an electronic gaming machine. The first and second display panels may receive synchronized image data signals to display synced images that appear as a three-dimensional image when viewed from the front (e.g., when viewed by a user looking through both the first and second display panels towards the electronic gaming machine). For example, a background image (such as scenery) may be displayed on the second display panel behind a foreground image (such as a close-up object and/or person) displayed on the first display panel to give the appearance of a three-dimensional image when viewed from the front. Additionally, for example, a shared image may be displayed on both the first and second display panels to give the appearance of a three-dimensional image when viewed from the front.

The first and second display panels may also receive unsynchronized image data signals to display independent (e.g., desynced) images that appear as a three-dimensional image when viewed from the front. For example, a first image (such as an object and/or person) may be displayed on the first display panel and a second image (such as a different objection and/or person) may be displayed on the second display panel to give the appearance of three-dimensional depth between the first image and the second image when viewed from the front. In another example, an image may include dollar bills in the foreground, while a second, background image includes fireworks. The position, perceived movement, and timing of the dollar and firework images may be independent of one another while creating an impression of a three-dimensional composite display. Images may thus be related to one another (e.g., monies and fireworks both relating to a celebration), but may not be synchronized.

Embodiments of the present disclosure represent a technical improvement in the art of electronic gaming machines, systems, and operating for such electronic gaming machines or systems. Technical improvements represented by the present disclosure include: (i) an electronic gaming machine with an improved display that includes a transparent OLED display panel positioned in front of a second display panel to achieve a three-dimensional image effect without the use of three-dimensional glasses, lenticular lens, and/or a camera-based eye tracking system; (ii) an electronic gaming machine with an improved display that includes multiple stacked display panels to achieve a synchronized or an unsynchronized image effect; (iii) an electronic gaming machine with an improved display that varies the amount of light that is passed through a transparent OLED display panel to control the visibility of a second display panel stacked behind the transparent OLED display panel; (iv) an electronic gaming machine with an improved usage environment that includes minimal to no disruption to imaging for gameplay during needed maintenance and/or refresh of one of multiple stacked display panels; (v) an electronic gaming machine with an improved display that concurrently displays images generated by two independent signals; and (vi) an electronic gaming machine with an improved display that includes the use of multiple stacked displays to supplement display brightness and allow for display refresh to improve the life expectancy of the OLED displays.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more server computers 102 described herein.

The server computers 102 may include a central determination gaming system server (not separately shown), a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main or service door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket (e.g., a voucher) to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in gaming device 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
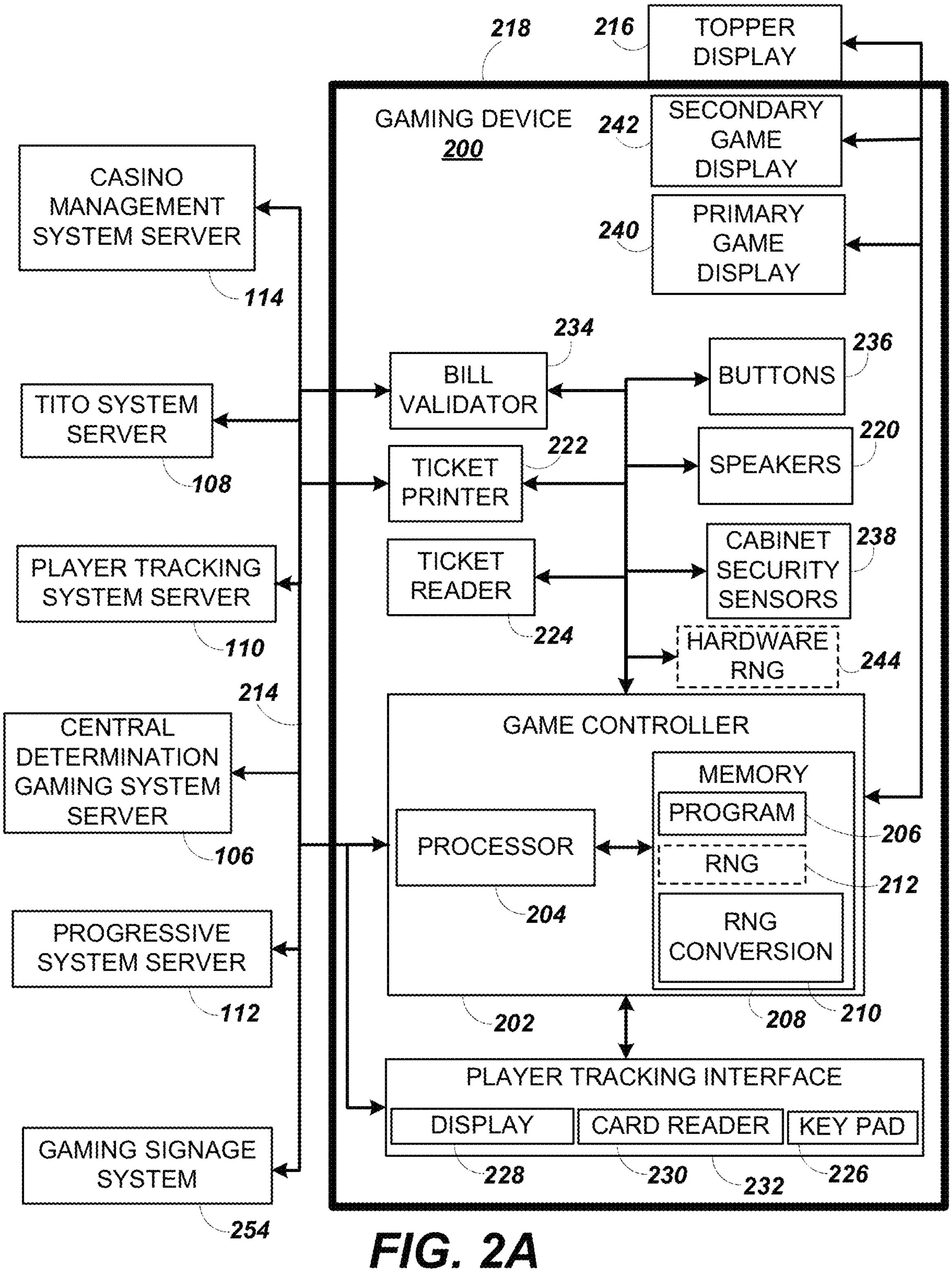
FIG. 2A is a block diagram showing various functional elements of an exemplary EGM.

Many or all the above-described components can be controlled by circuitry (e.g., a gaming controller) housed inside the main cabinet 116 of the gaming device 104A, the details of which are shown in FIG. 2A.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main or service door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Yet another example gaming device 104X is a tabletop or bar top gaming device that may provide many different types of games, including, for example, mechanical slot games, video slot games, video poker, video blackjack, video pachinko, keno, bingo, and lottery. Each EGM 104 may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Any of the EGMs 104 may include a button deck 120. In the example embodiments described herein, the button deck 120 may include a button deck (not separately shown in FIG. 1) that includes one or more buttons 122 that may be configurable and that may be backlit by an LCD button deck display device within the button deck 120.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes a processor system that includes one or more processors. The processors may be collocated and/or distributed throughout the gaming device. Another processor comprising part of the processing system may be remotely located from the gaming device (e.g., at a remote server wirelessly connected to the gaming device). For example, processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3)

source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
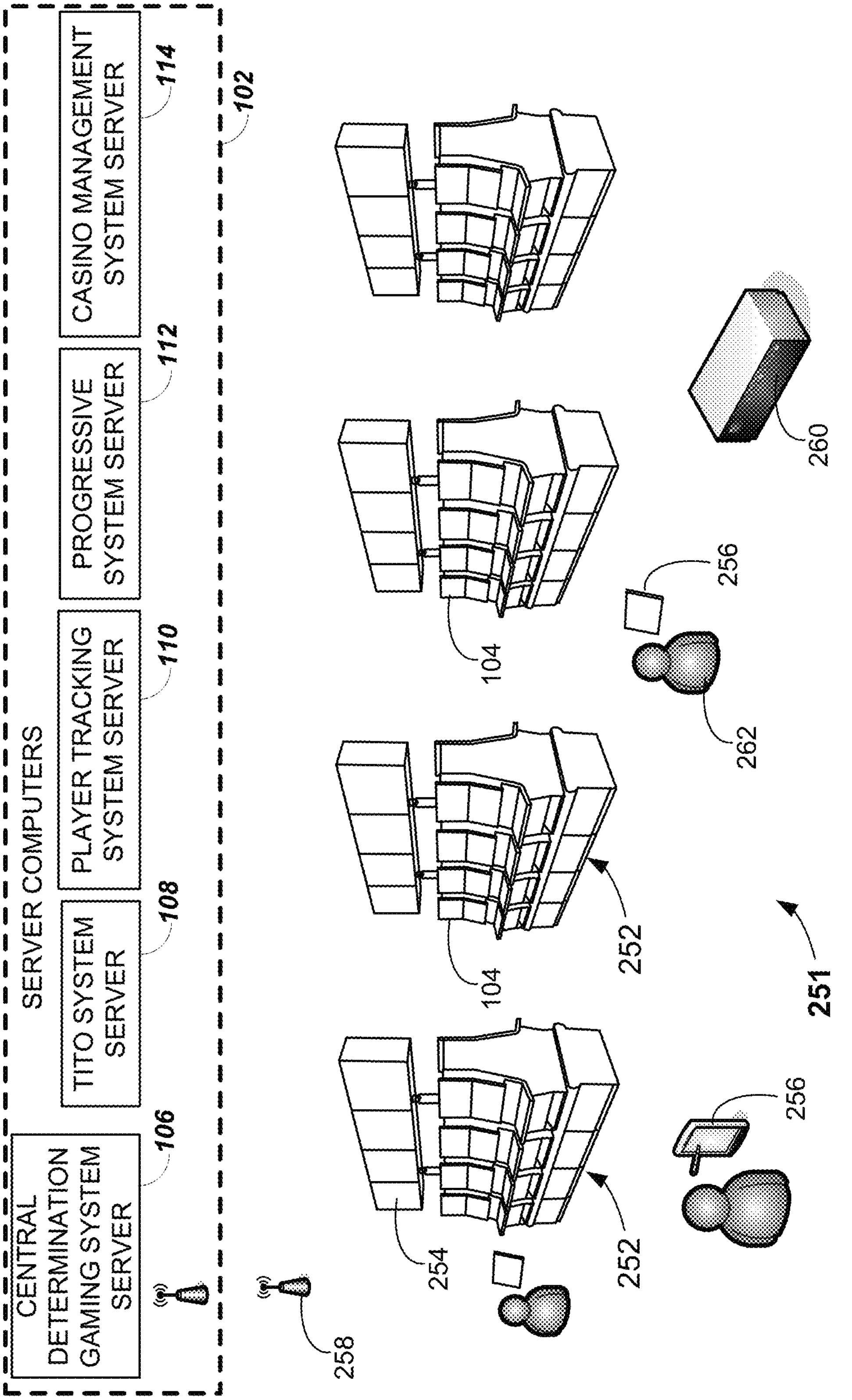
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
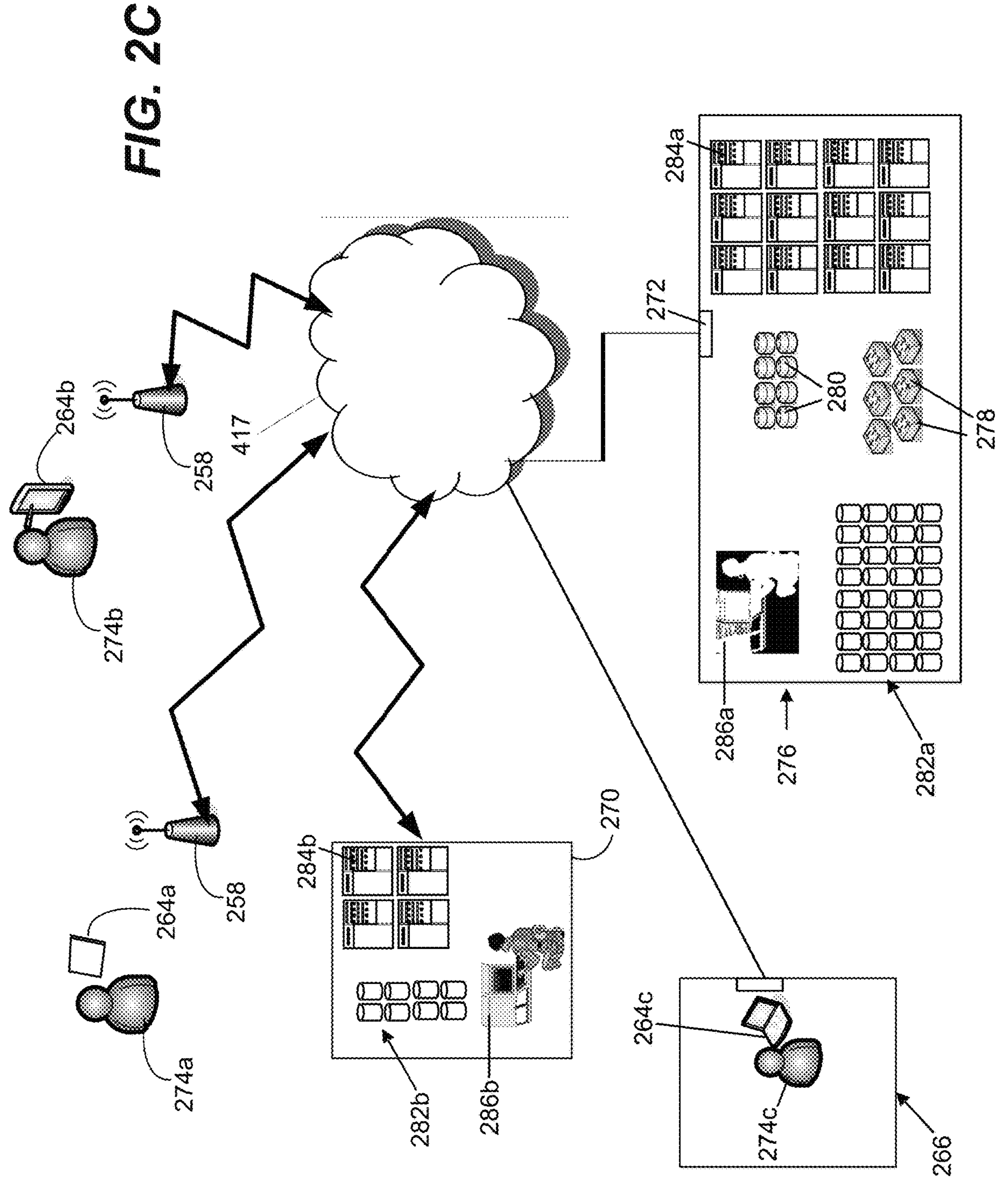
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
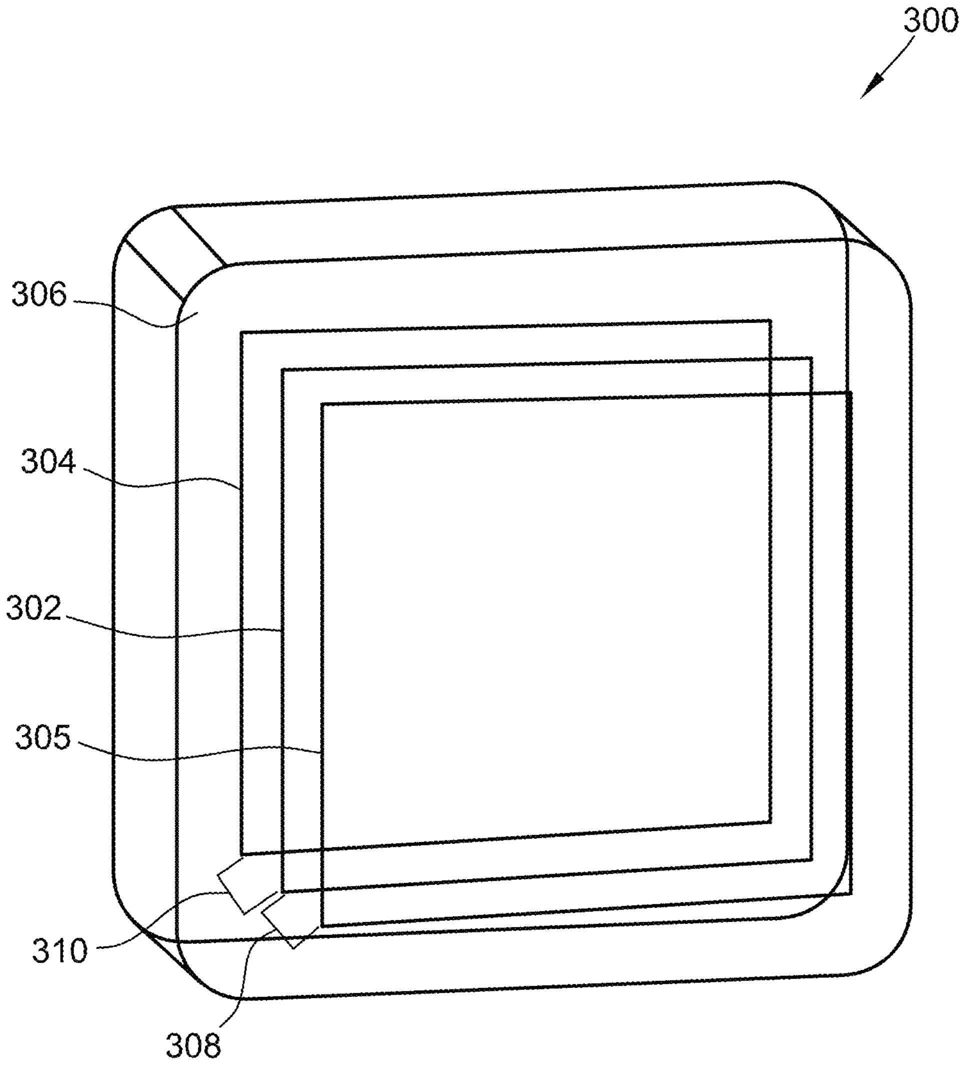
FIG. 3 is a perspective view of exemplary multi-stacked transparent display panels of an EGM.

FIG. 3 is a perspective view of a multi-stacked display device 300 having multi-stacked display panels for use with an electronic gaming machine. In the example embodiment, multi-stacked display device 300 includes a first display panel 302 and a second display panel 304, with first display panel 302 positioned in front of (e.g., closer to a user of the electronic gaming machine) the second display panel 304. In some embodiments, multi-stacked display device 300 may include additional display panels beyond first display panel 302 and second display panel 304. Additionally, in the example embodiment, multi-stacked display device 300 includes a cover panel 305 positioned in front of first display panel 302. Cover panel 305 may be manufactured from a glass, or other, material and may be configured such that human touch can be detected. In the example embodiment, first display panel 302, second display panel 304, and cover panel 305 are combined to form the multi-stacked display device 300 and fitted into a display housing 306 installed on an electronic gaming machine (not shown in FIG. 3), such as gaming devices 104A-104X, to deliver or transmit views of digital and physical objects.

The first display panel 302, the second display panel 304, and the cover panel 305 construct the multi-stacked display device 300 which delivers or transmits the views of the digital and the physical objects as: non-immersive video (i.e., images that can be experienced directionally with respect to the transmitting screen); immersive video (i.e., images that can be experienced omnidirectionally (i.e., 360 degree) with respect to a viewer); virtual reality (i.e., images within in a fully-immersive digital environment); augmented reality (i.e., images of physical objects with an overlay of digital elements); and mixed reality (i.e., a view of physical objects with an overlay of digital objects where the physical objects interact with the digital objects). The characteristics of the views of the digital and physical objects, as transmitted by the multi-stacked display device 300, can be impacted by structural factors and electronic controls.

The structural factors can include: (a) arrangements of the first display panel 302, the second display panel 304, and the cover panel 305; (b) opaque properties of the first display panel 302 and the second display panel 304, which can be inherent to the first display panel 302 and the second display 304; and (c) gap configurations with the multi-stacked display device 300.

The electronic controls are configured to manage: (a) respective images on the first display panel 302 and the second display panel 304 synchronically (i.e., synced images across 2 or more displays in the views of digital and tangible objects); (b) respective images on the first display panel 302 and the second display panel 304 independently (i.e., desynced images across 2 or more displays in the views of digital and tangible objects); (c) opaqueness of OLED displays in the first display panel 302 and the second display panel 304, based on the strength of non-transitory signals; (d) signals sent only to the first display panel 302 or the second display panel 304, such that at least one display panel is activated while at least one display is deactivated in the multi-stacked device 300; (e) allocation of portions of the first display panel 302 and the second display panel 304 for appearing transparent, thereby impacting the view of digital and tangible objects, as transmitted by the multi-stacked display device 300; and (f) pixel activation in the first display panel 302 and the second display panel 304, wherein the pixel activation in the first display panel 302 can be different from the second display panel 304.

Figure 5:
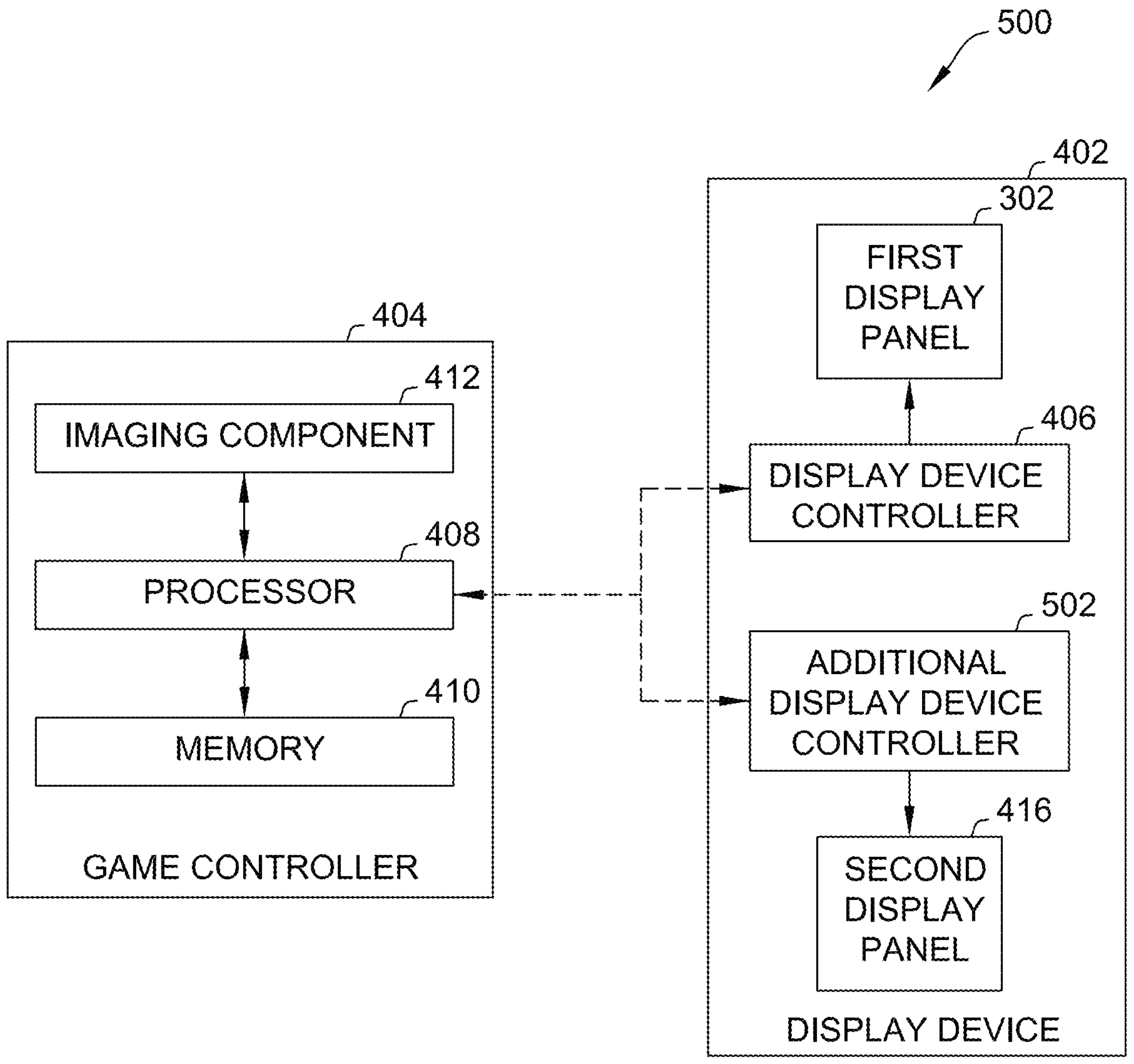
FIG. 5 is an additional block diagram showing various functional elements of exemplary multi-stacked transparent display panels of an EGM.
Figure 6:
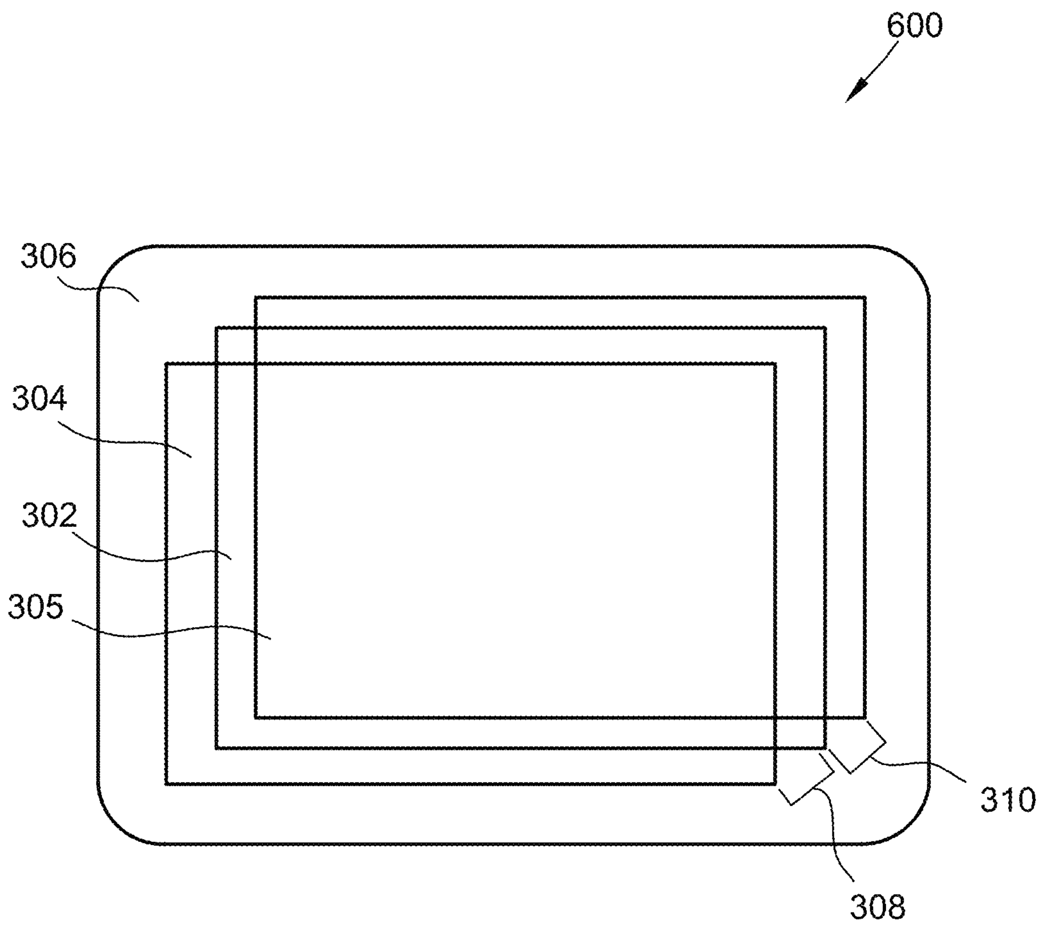
FIG. 6 is a front view of exemplary multi-stacked transparent display panels of an EGM.

The multi-stacked display device 300 may be constructed in different arrangements (such as a first arrangement, a second arrangement, and so forth), based on size, shape, and portrait orientation of the first display panel 302, the second display panel 304, and the cover display panel 304. The first display panel 302, the second display panel 304, and the cover panel 305 may be practically any size and/or shape, including in a portrait orientation (as shown in FIG. 3) and/or a landscape orientation (as shown in FIG. 6). That is, multi-stacked display device 300 may be used with practically any size and/or shape of electronic gaming machine. For example, first display panel 302, second display panel 304, and cover panel 305 may be similarly sized (as shown in FIGS. 3 and 5). Alternatively, for example, first display panel 302, second display panel 304, and cover panel 305 may be of varying sizes. For example, first display panel 302 may be larger than second display panel 304. In other embodiments, the larger size of first display panel 302 may allow first display panel 302 to include an edge extending past all sides of second display panel 304 to be used for lighting. The multi-stacked display device 300 is modifiable with respect to dimensions, orientation, and positions of the first display panel 302, the second display panel 304, and the cover panel 305 (i.e., at least the first arrangement and the second arrangement). The first arrangement is different from the second arrangement, wherein the first arrangement is associated with a first transmitted display of digital and physical objects and the second arrangement is associated with a second transmitted display of digital and physical objects. The first transmitted view of digital and physical objects has different visual characteristics than the second transmitted view of digital and physical objects. Stated another way, the modifiable multi-stacked display device 300 can impact the transmitted views of the digital and the physical objects.

The opaque properties of the first display panel 302 and the second display panel 304 (e.g., O1, O2, O3, O4, and O5), in combination with the arrangements of the first display panel 302, the second display panel 304, and the cover display panel 304, can further impact the transmitted views of the digital and the physical objects via leveraging levels of opaqueness (i.e., fully opaque to fully transparent) of the first display panel 302 and the second display panel 304. The opaque properties are inherent the first display panel 302 and the second display panel 304. In the example embodiment, first display panel 302 includes an OLED display that is configured such that the opaqueness of first display panel 302 can be varied to control the amount of light passing through first display panel 302. (O1). First display panel 302 may be configured to have an opaqueness such that first display panel 302 appears transparent (O2). In some embodiments, the second display panel 304 may include an LED display, with the opaqueness of first display panel 302 controlling the amount of backlight from the second display panel 304 passing through first display panel 302 (O3). In other embodiments, second display panel may include an OLED display, with the opaqueness of first display panel 302 controlling the amount of light from a source other than second display panel 304 passing through first display panel 302 (O4). Second display panel 304 may be configured such that second display panel 304 appears transparent (O5). The opaque properties (e.g., O1, O2, O3, O4, and/or O5), which are ca leveraging the opaqueness level of the first display panel 302 and the second display panel 304, in combination with the first arrangement or the second arrangement, can support the multi-stacked display 300 in (a) altering the first transmitted view or the second transmitted view of the digital and physical objects; or (b) maintaining the first transmitted view or the second transmitted view of the digital and physical objects.

The gap configurations within the multi-stacked display 300 (e.g., G1, G2, and G3), in combination with: (1) the opaque properties of the first display panel 302 and the second display panel 304 and/or (2) the arrangements of the first display panel 302, the second display panel 304, and the cover display panel 304, can further impact the transmitted views of the digital and the physical objects via leveraging the medium or contents within the gap configurations, such as air and optic bonding enabled regions. In the example embodiment, multi-stacked display device 300 includes a first gap 308 between cover panel 305 and first display panel 302, as well as a second gap 310 between first display panel 302 and second display panel 304. First gap 308 and/or second gap 310 may be filled with a gas, such as air (~21% by weight of oxygen, ~78% by weight of nitrogen, and 1% by weight of other gases), argon, helium, nitrogen, and oxygen (G1). In some embodiments, the first gap 308 may be configured for optic bonding between cover panel 305 and first display panel 302 (G2), and/or the second gap 310 may be configured for optic bonding between first display panel 302 and second display panel 304 (G3). In the example embodiment, each of first display panel 302, second display panel 304, and cover panel 305 are sealed along all sides to keep dust out of first gap 308, second gap 310, and display housing 306. The gap configurations (e.g., G1, G2, and G3), which are leveraging the medium or contents therein, in combination with: (1) the opaque properties of the first display panel 302 and the second display panel 304 and/or (2) the arrangements of the first display panel 302, the second display panel 304, and the cover display panel 304, can support the multi-stacked display 300 in: (a) altering the first transmitted view or the second transmitted view of the digital and physical objects; or (b) maintaining the first transmitted view or the second transmitted view of the digital and physical objects.

Figure 4:
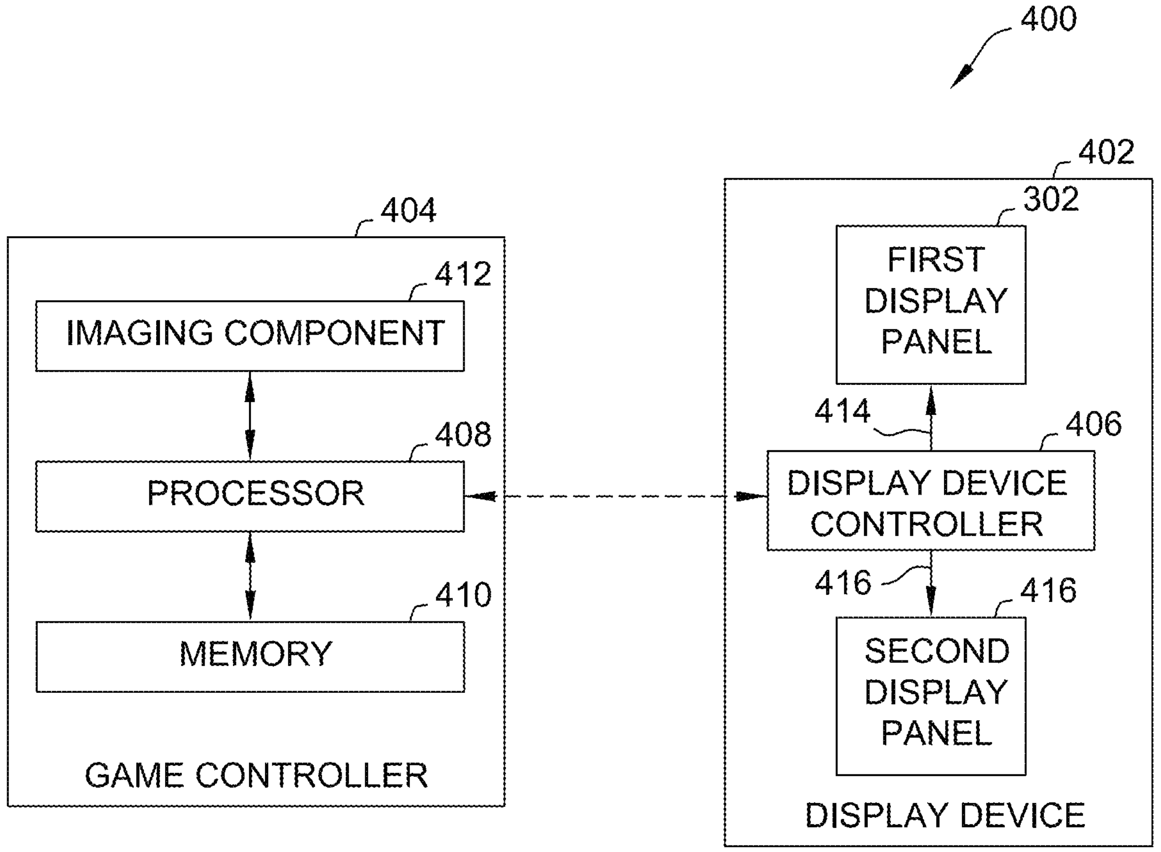
FIG. 4 is a block diagram showing various functional elements of exemplary multi-stacked transparent display panels of an EGM.

FIG. 4 is a block diagram depicting exemplary internal components of a gaming machine 400 with a stacked display. As shown in FIG. 4, gaming machine 400 includes a display device 402 and a game controller 404. In the example embodiment, display device 402 includes first display panel 302 and second display panel 304, each of which are in communication with a display device controller 406. In some embodiments, display device 402 may include additional display panels in communication with display device controller 406. In the example embodiment, game controller 404 includes a processor 408, a memory 410, and an imaging component 412. In some embodiments, game controller 404 may include more or fewer components. In the exemplary embodiment, processor 408 is in communication with imaging component 412 and memory 410. Additionally, in the exemplary embodiment, processor 408 is in communication with display device controller 406.

In the exemplary embodiment, game controller 404 is configured to control the transmission of an image data signal for each display panel of display device 402. Specifically, display device controller 406 may receive: (1) a first image data signal 414 to be transmitted to first display panel 302, and in turn display a first image in the first display panel 302; and (2) a second image data signal 416 to be transmitted to second display panel 304, and in turn display a second image in the second display panel 302. The views, as transmitted by multi-stacked display 300, can be composed of the first image and the second image, as displayed on the first display panel 302 and the second display 304, respectively. In some embodiments, prior to transmission of first and second image data signals 414, 416, display device controller 406 may sync first and second image data signals 414, 416 to sync the first and second images displayed on first and second display panels 302, 304. The display of synchronized first and second images on first and second display panels 302, 304 may lead to the view, as transmitted by multi-stacked display 300, that appears as a three-dimensional image when viewed from the front (e.g., when viewed by a user looking through both of first and second display panels 302, 304 towards the electronic gaming machine). For example, a background image (such as scenery) may be displayed on second display panel 304 behind a foreground image (such as a close-up object and/or person) displayed on first display panel 302 to give the appearance of a three-dimensional image when viewed from the front. Additionally, for example, a shared image may be displayed on both of first and second display panel 302, 304 to give the appearance of a three-dimensional image when viewed from the front.

In a particular example of synchronized image data, an EGM may display reels in the background (i.e., the second display panel 304), while symbols are displayed in the foreground (i.e., the first display panel 302). The timing, positioning, and perceived movement of the respective images of the reels and the symbols may be coordinated or otherwise synchronized such that the symbols appear to move in sequence with the spinning reels. In another example of synchronized image data, an image presented at one display screen (i.e., the second display panel 304) may include video of a charging buffalo. Certain of the pixels of an overlaying display panel (i.e., the first display panel 302) may be made to be transparent so that that portions of the underlying buffalo video show through. Other pixels of the overlaying display panel may display image data corresponding to legs and horns of the buffalo to create a three-dimensional impression.

In other embodiments, display device controller 406 may transmit first and second image data signals 414, 416 separately to display independent (e.g., desynced) images on first and second display panels 302, 304. The view, as transmitted by multi-stacked display 300, can be composed of the independent, desynced images on the first and second display panels 302, 304. The display of independent images on first and second display panels 302, 304 may lead to a view, as transmitted by multi-stacked display 300, appear as a three-dimensional image when viewed from the front. For example, a first image (such as an object and/or person) may be displayed on first display panel 302 and a second image (such as a different objection and/or person) may be displayed on second display panel 304 to give the appearance of three-dimensional depth between the first image and the second image when viewed from the front. Alternatively, for example, the display of independent images on first and second display panels 302, 304 may appear as unrelated images and/or messages.

In the example embodiment, game controller 404 and display device controller 406 are configured to control the opaqueness of the OLED display of first display panel 302. First image data signal 414 may be transmitted to first display panel 302 to control the amount of light filtered through first display panel 302, thus changing the opaqueness of the OLED display. For example, first display panel 302 may appear opaque (e.g., not transparent) when an image signal is not being transmitted and received. That is, in the absence of first image data signal 414, the lack of power current through the OLED display may result in first display panel 302 appearing opaque. Alternatively, for example, first display panel 302 may appear transparent when an image signal is transmitted and received. That is, in the presence of first image data signal 414, the power current through the OLED display may result in first display panel 302 appearing transparent. In some embodiments, game controller 404 and display device controller 406 may be configured to also control the opaqueness of the OLED display of second display panel 304 via second image data signal 416. The view, as transmitted by the multi-stacked display 300, can be composed of varied levels of opaqueness of OLED displays in the first display panel 302 and the second display panel 304.

In some embodiments, the opaqueness of the OLED display may depend on the strength of first image data signal 414 as transmitted to first display panel 302. Strength of signal, such as the first image data signal, may impact display characteristics including brightness, focus, contrast, color gradients, and hue. For example, a lower strength of first image data signal 414 may result in an image displayed on first display panel 302 appearing "stronger" (e.g., more distinguishable and/or brighter) on a mostly opaque OLED display. A more distinguishable image displayed on first display panel 302 may make it harder to see a second image as displayed on second display panel 304 behind (e.g., farther away from a user of the electronic gaming machine) first display panel. Alternatively, for example, a higher strength of first image data signal 414 may result in an image displayed on first display panel 302 appearing "weaker" (e.g., less distinguishable and/or less bright) on a mostly transparent OLED display. A less distinguishable image displayed on first display panel 302 may make it easier to see a second image as displayed on second display panel 304 behind first display panel 302.

In some embodiments, game controller 404 may transmit a signal to display device controller 406 for only one of first display panel 302 and/or second display panel 304. That is, all images for the electronic gaming machine controlled by game controller 404 may be displayed by only one of first display panel 302 and/or second display panel 304, as the view transmitted by the multi-stacked display device 300. For example, one of first display panel 302 and/or second display panel 304 may need to be repaired and/or replaced, allowing the other of first display panel 302 and/or second display panel 304 to continue to display the images needed by game controller 404 to keep the electronic gaming machine running. Additionally, for example, one of first display panel 302 and/or second display panel 304 may need time to refresh the OLED displays, allowing the other of first display panel 302 and/or second display panel 304 to continue to display the images needed by game controller 404 to keep the electronic gaming machine running. In some embodiments, the game controller 404 may activate and/or deactivate first display panel 302 and/or second display panel 304 based on a refresh scheduled stored in memory 410 to improve the life expectancy of the OLED displays. In other embodiments, the game controller 404 may activate and/or deactivate first display panel 302 and/or second display panel 304 based on detected user activity at or proximate to the electronic gaming machine. In a particular implementation, one of the first or second displays may run in standby mode while the other runs in play mode.

In one example, the game controller 404 of an embodiment may provide display data to at least one of the first and second display panels 302, 304 to cause a display of a single image when viewed by a user looking through both the first and second display panels 302, 304 towards the electronic gaming device 200 via allocation of portions of the first display panel 302 and the second display panel 304 for appearing transparent. In so doing, the game controller 404 may cause at least one of a portion of the first display panel 302 and a portion of the second display panel 304 to appear transparent. In this example, a first portion of the at least one portion of the first display panel 302 is transparent and a second portion of the at least one portion of the first display panel 302 is non-transparent; and a first portion of the at least one portion of the second display 304 is transparent and a second portion of the at least one portion of the second display 304 is non-transparent. The view, as transmitted by multi-stacked display 300, can be composed of transparent portions in the first display panel 302 and the second display panel 304 in combination with non-transparent portions in the first display panel 302 and the second display panel 304.

FIG. 5 is a block diagram depicting exemplary internal components of a gaming machine 500 with a stacked display. Gaming machine 500 is similar to that of gaming machine 400 as shown in FIG. 4, with the only difference being that display device 402 of gaming machine 500 includes display device controller 406 and an additional display device controller 502 (as shown in FIG. 5). In the exemplary embodiment, game controller 404 is configured to control the transmission of an image data signal for each display panel of display device 402. Specifically, display device controller 406 may receive a first image data signal 414 to be transmitted to first display panel 302 and additional display device controller 502 may receive a second image data signal 416 to be transmitted to second display panel 304. The transmission of first image data signal 414 by display device controller 406 and second image data signal 416 by additional display device controller 502 may facilitate the display of independent (e.g., desynced) images on first and second display panels 302, 304, as the view transmitted by multi-stack display 300.

FIG. 6 is a front view of a multi-stacked display device 600 having multi-stacked display panels for use with an electronic gaming machine. Multi-stacked display device 600 is similar to that of multi-stacked display device 300 as shown in FIG. 3, with the only difference being that multi-stacked display device 600 is in a landscape orientation (as shown in FIG. 6) as opposed to the portrait orientation of multi-stacked display device 300 (as shown in FIG. 3).

Figure 7:
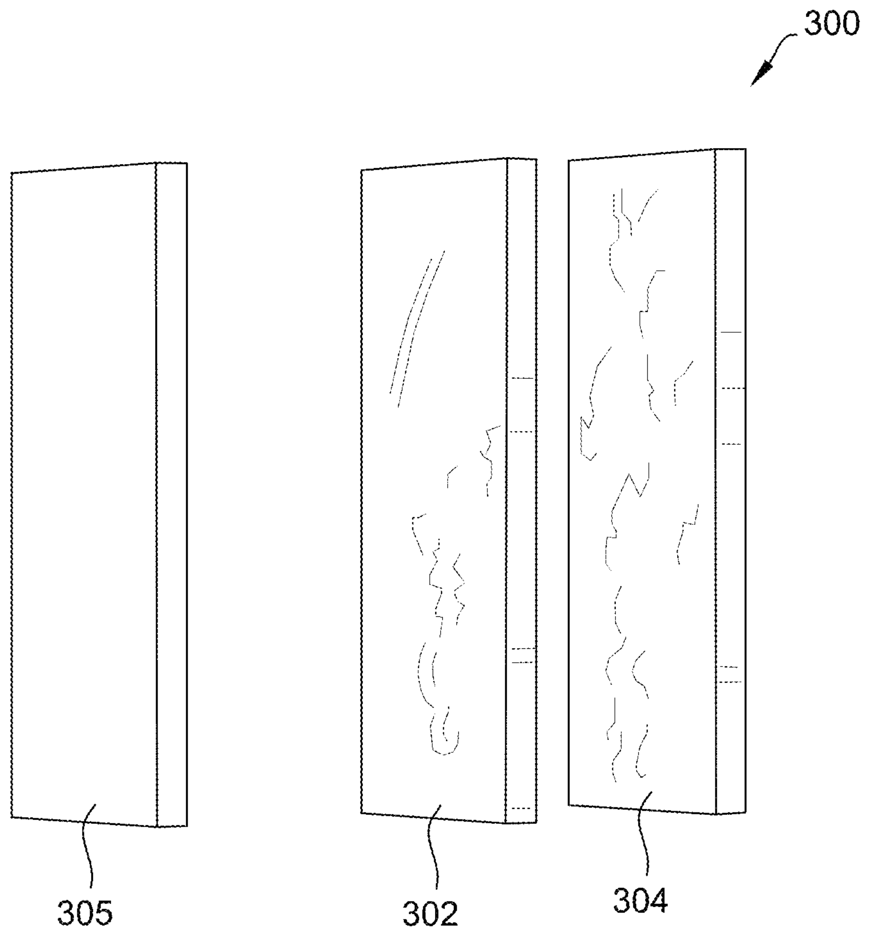
FIG. 7 is a perspective side view of the exemplary multi-stacked transparent display panels shown in FIG. 3.

FIG. 7 is a side perspective view of the multi-stacked display device 300 having multi-stacked display panels for use with an electronic gaming machine. In the example embodiment, image signals may be transmitted to first display panel 302 and second display panel 304 (such as first image data signal 414 and second image data signal 416, as shown in FIG. 4) concurrently via leveraging pixel activation. That is, image pixels may be present on first display panel 302 and second display panel 304 at the same time, as shown in FIG. 7. In some embodiments, only some of the pixels on first display panel 302 may be activated to make the corresponding areas of first display panel 302 transparent, making the vertically aligned pixels of second display panel 304 visible through first display panel 302. In other embodiments, various combinations of pixels on first display panel 302 and/or second display panel 304 may be activated to achieve various visual effects, such as three-dimensional image effects. The view, as transmitted by the multi-stacked display 300, can be composed of varied levels of pixel activation in the first display panel 302 and the second display panel 304 to achieve the visual effects, such as three-dimensional image effects.

The multi-stacked display 300 transmits a view, which can include and is formed images from: the first display panel 302 and the second display panel 304; only the first display panel 302; and only the second display panel 304. The characteristics of view can be impacted by the one or more of structural factors and electronic controls, as described above. Stated another way, the combination and permutations of the structural factors and electronic controls can effect and control the characteristics of the view.

Figure 8:
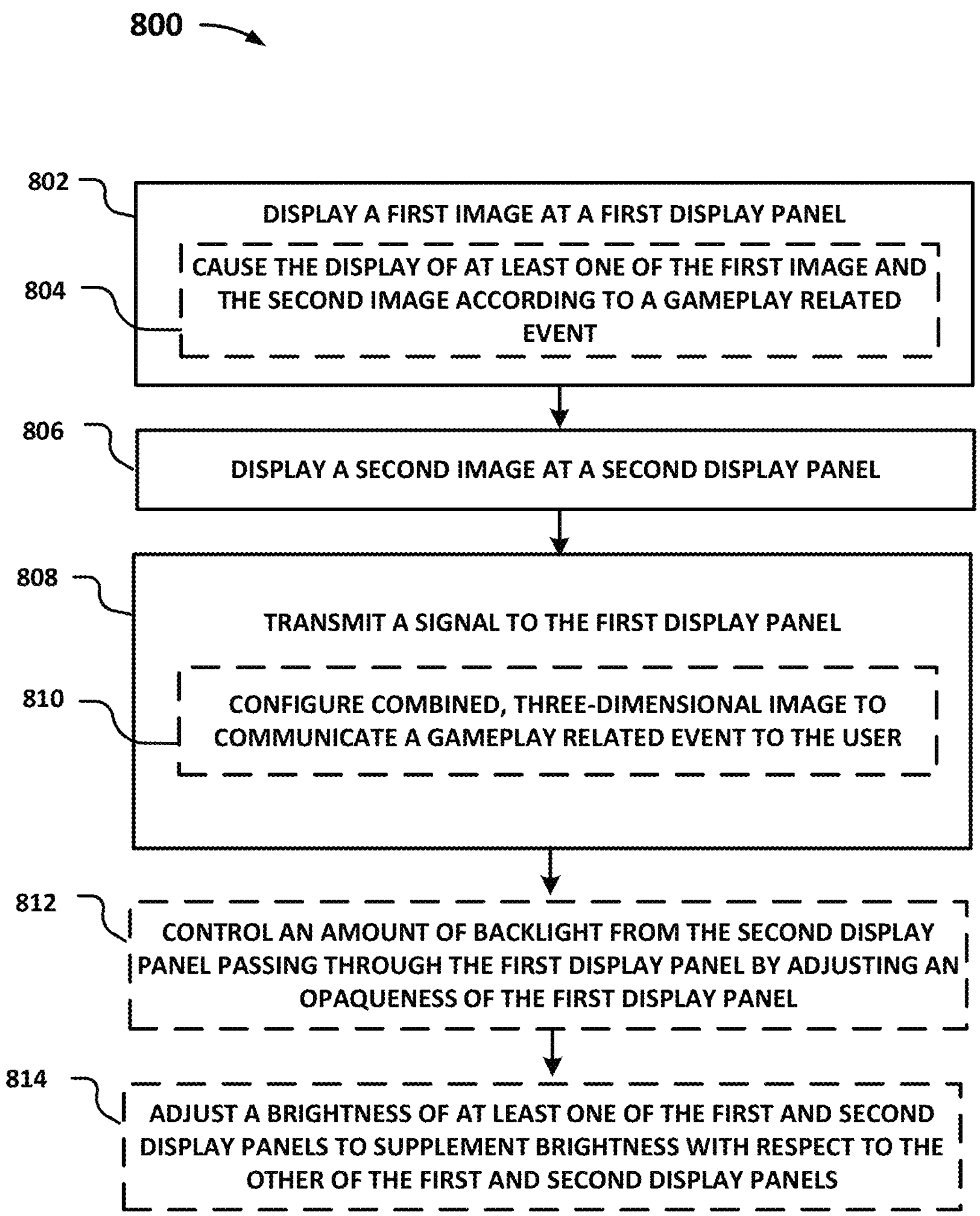
FIG. 8 is a flowchart of an embodiment of a method of configuring an electronic gaming machine display comprising multiple panels having selectively transparent pixels.

FIG. 8 is a flowchart of an embodiment of a method 800 of displaying data at an EGM. The illustrative method 800 may be performed by any of the preceding systems described in FIGS. 1-7. Dashed lines indicate that the associated processes may be optionally implemented as specifically programmed.

Turning more particularly to the flowchart, the method 800 at step 802 may include displaying a first image at a first display panel. For example, the game controller 404 of FIG. 4 may send image data 414 to the first display panel 302.

In one implementation, the game controller may cause at step 804 the display of at least one of the first image and the second image according to a gameplay related event. For example, the game controller 404 of FIG. 4 may send data 414 in response to a user achieving a high score at the EGM.

At step 806, the method 800 may include displaying a second image at a second display panel. Continuing with the above example, the game controller 404 of FIG. 4 may send image data 416 to the second display panel 304.

The illustrative method 800 may include transmitting a signal at step 808 to the first display panel. The signal may cause at least a portion of the first display panel to appear transparent such at least a portion of the second image displayed on the second display panel is at least partially visible through the first display panel. In this manner, at least a portion of the first image and at least the portion of second image form a combined view. The combined view may appear as a three-dimensional image when viewed by a user looking through both the first and second display panels towards the electronic gaming device. For instance, the game controller 404 of FIG. 4 may transmit a signal to the first display panel 302 causing certain pixels of the first display panel 302 to be transparent.

According to a particular implementation, the combined, three-dimensional image may communicate at step 810 a gameplay related event to the user. For example, a combined, three-dimensional image of a rocket display may indicate to the user that they have earned a free spin at the EGM.

At step 812, the method 800 may include comprising controlling an amount of backlight from the second display panel passing through the first display panel by adjusting an opaqueness of the first display panel. For example, the opaqueness of the first display panel 302 of FIG. 4 may be varied to control the amount of light passing through first display panel 302. In a particular instance, the first display panel 302 may be configured to have an opaqueness such that first display panel 302 appears transparent.

At step 814, the method 800 may include adjusting a brightness of at least one of the first and second display panels to supplement brightness with respect to the other of the first and second display panels. For example, the game controller 404 of FIG. 4 may adjust a brightness of either the first or second display panels 302, 304 to supplement brightness with respect to the other panel.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:

a display device comprising a cover panel and a plurality of display panels stacked behind the cover panel, wherein the plurality of display panels includes at least a first display panel and a second display panel; and a game controller comprising at least one processor in communication with a memory, wherein the game controller is configured to:

cause a display of a first image on the first display panel;

cause a display of a second image on the second display panel;

transmit a signal to the first display panel, wherein the signal causes at least a portion of the first display panel to appear transparent such that at least a portion of the second image displayed on the second display panel is at least partially visible through the first display panel so at least a portion of the first image and at least the portion of second image form a combined view, wherein the combined view is a three-dimensional image when viewed by a user looking through both the first and second display panels towards electronic gaming device; and deactivate at least one of the first display panel and the second display panel based on at least one of a stored schedule and whether user activity is detected proximate to the electronic gaming device.

2. The electronic gaming device of claim 1, wherein the game controller causes the display of at least one of the first image and the second image according to a gameplay related event.

3. The electronic gaming device of claim 1, wherein the three-dimensional image communicates a gameplay related event to the user.

4. The electronic gaming device of claim 1, wherein the first display panel comprises an organic light-emitting diode (OLED) display.

5. The electronic gaming device of claim 1, wherein the second display panel comprises at least one of an organic light-emitting diode (OLED) display and a liquid crystal display (LCD).

6. The electronic gaming device of claim 1, wherein the first display panel at least partially overlaps the second display panel.

7. The electronic gaming device of claim 1, wherein the first and second images are synchronized with respect to one another.

8. The electronic gaming device of claim 1, wherein the first and second images are unsynchronized with respect to one another.

9. The electronic gaming device of claim 1, wherein the at least one processor further configured to adjust a brightness of at least one of the first and second display panels to supplement brightness with respect to the other of the first and second display panels.

10. The electronic gaming device of claim 1, wherein the at least one processor is further configured to vary an amount of light that is passed through the first display panel to control a visibility of the second display panel.

11. The electronic gaming device of claim 1, wherein the at least one processor is further configured to control an amount of backlight from the second display panel passing through the first display panel by adjusting an opaqueness of the first display panel.

12. The electronic gaming device of claim 1, further comprising an air-filled gap between the first and second display panels.

13. The electronic gaming device of claim 1, wherein the cover panel and the first and second display panels are sealed together along their sides.

14. The electronic gaming device of claim 1, wherein the at least one processor is further configured to control an amount of opaqueness of the first display panel based on a strength of a first image data signal transmitted to the first display panel.

15. An electronic gaming device comprising:

a display device comprising a cover panel and a plurality of display panels stacked behind the cover panel, wherein the plurality of display panels includes at least a first display panel and a second display panel; and a game controller comprising at least one processor in communication with a memory, wherein the game controller is configured to provide display data to at least one of the first and second display panels to cause a display of a single image when viewed by a user looking through both the first and second display panels towards the electronic gaming device, wherein causing the display of the single image includes causing at least one of a portion of the first display panel and a portion of the second display panel to appear transparent, wherein the at least one processor is further configured to deactivate at least one of the first and second display panels based on at least one of a stored schedule and whether user activity is detected proximate to the electronic gaming device.

16. The electronic gaming device of claim 15, wherein the stored schedule is a stored refresh schedule.

17. A method of displaying data at an electronic gaming device, the method comprising:

displaying a first image at a first display panel;

displaying a second image at a second display panel;

transmitting a signal to the first display panel, wherein the signal causes at least a portion of the first display panel to appear transparent such at least a portion of the second image displayed on the second display panel is at least partially visible through the first display panel so at least a portion of the first image and at least the portion of second image form a combined view, wherein the combined view is a three-dimensional image when viewed by a user looking through both the first and second display panels towards the electronic gaming device; and deactivating at least one of the first display panel and the second display panel based on at least one of a stored schedule and whether user activity is detected proximate to the electronic gaming device.

18. The method of claim 17, further comprising controlling an amount of backlight from the second display panel passing through the first display panel by adjusting an opaqueness of the first display panel.

19. The method of claim 17, further comprising adjusting a brightness of at least one of the first and second display panels to supplement brightness with respect to the other of the first and second display panels.

20. The method of claim 17, further comprising varying an amount of light that is passed through the first display panel to control a visibility of the second display panel.

* * * * *